Figure 1:
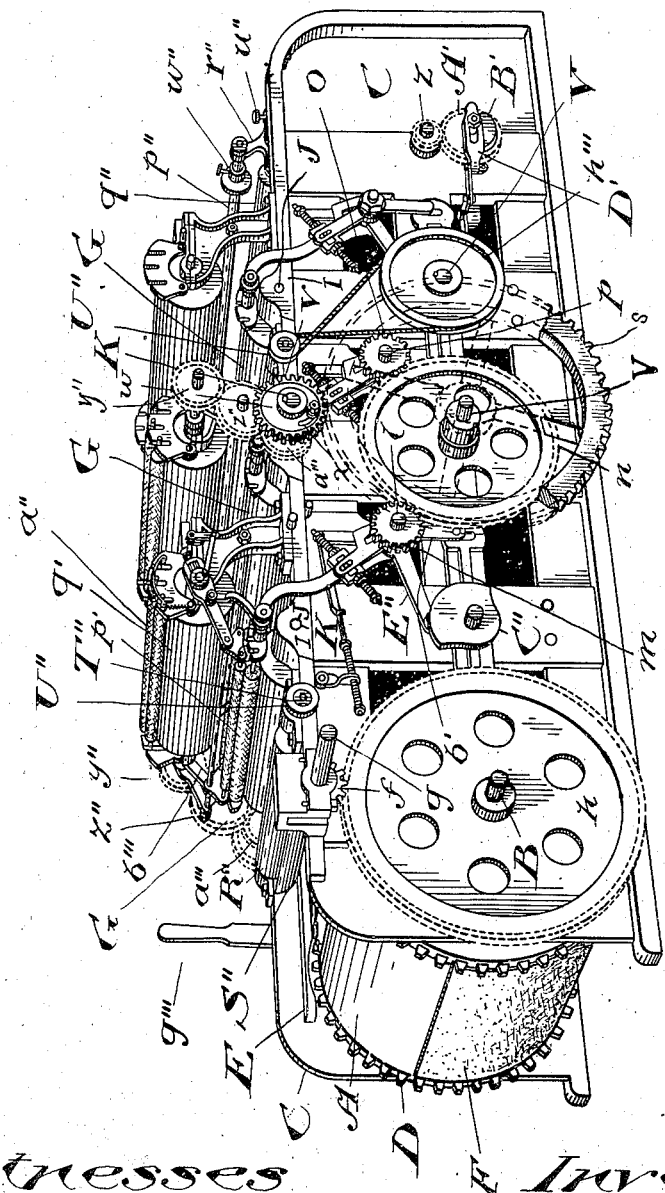

(No Model.)  8 Sheets—Sheet 1.

W. G. ROCHESTER.
APPARATUS FOR PRODUCING LITHOGRAPHS, &c.

No. 580,509. Patented Apr. 13, 1897.

Witnesses
Fred Clarke
A. N. Neff

Inventor
Wm G. Rochester
by
Ridout & Maybee
Attys (No Model.)
W. G. ROCHESTER.
APPARATUS FOR PRODUCING LITHOGRAPHS, &c.
No. 580,509. Patented Apr. 13, 1897.
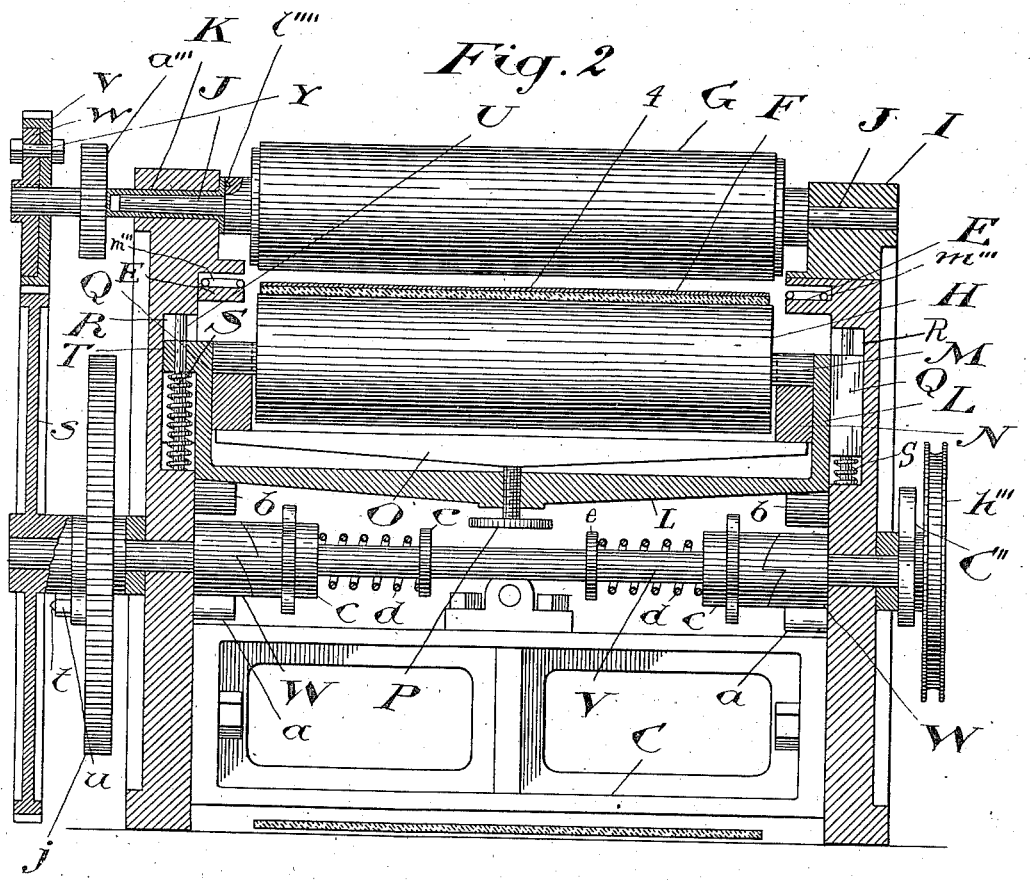
Witnesses
Fred Clarke
A. W. Neff
Inventor
Wm. G. Rochester
by
Ridout & Maybee
Attys

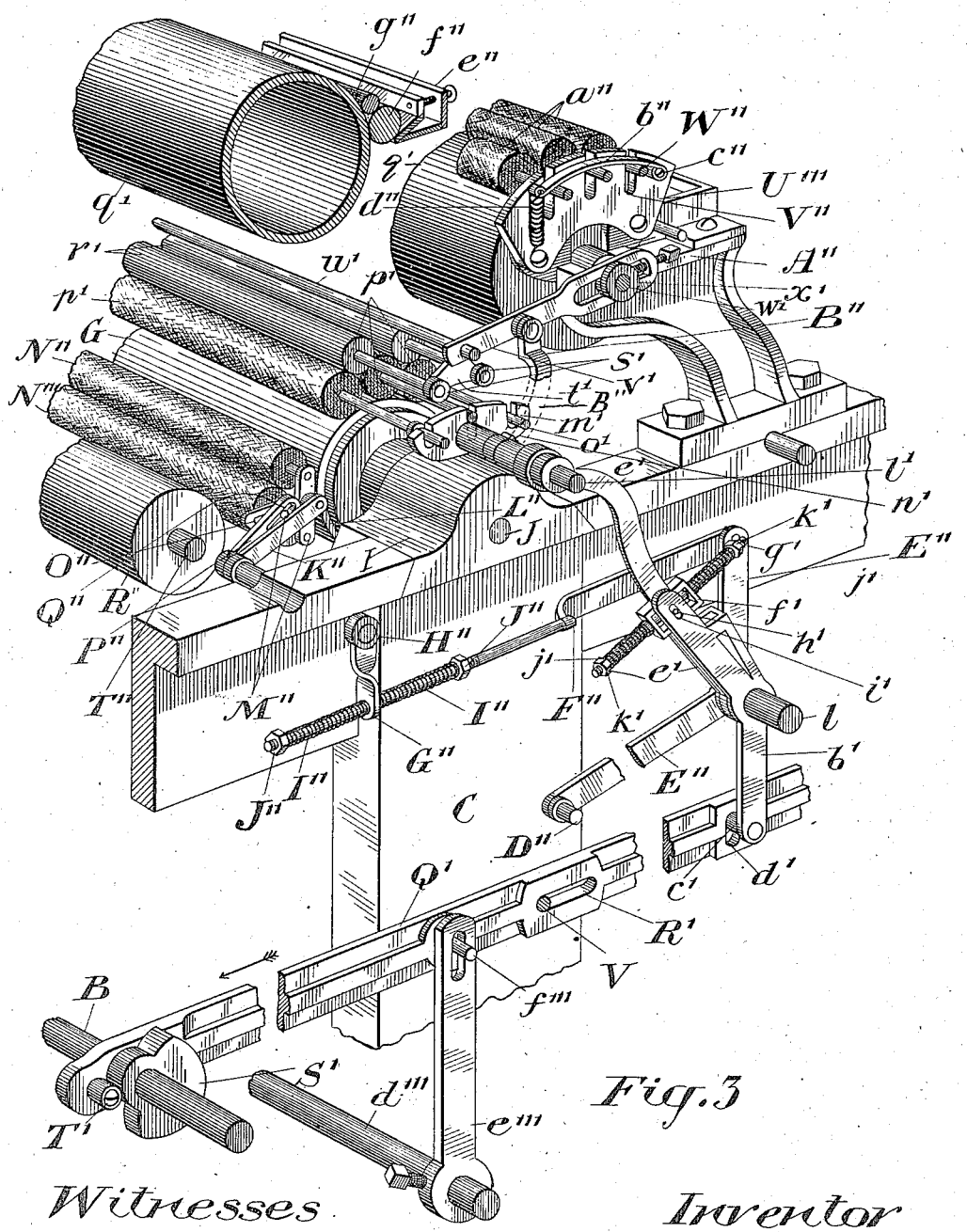

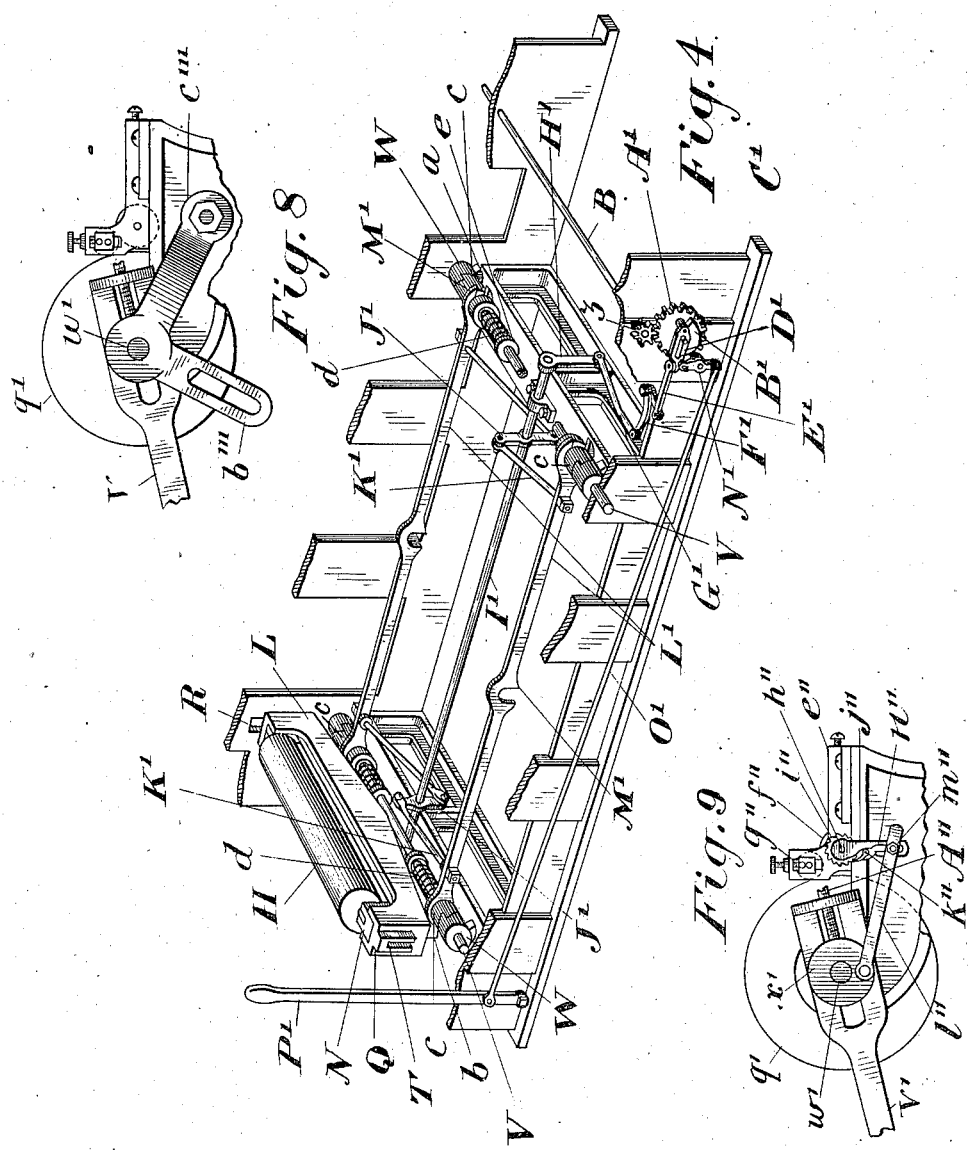

(No Model.) 8 Sheets—Sheet 5.
W. G. ROCHESTER.
APPARATUS FOR PRODUCING LITHOGRAPHS, &c.
No. 580,509. Patented Apr. 13, 1897.
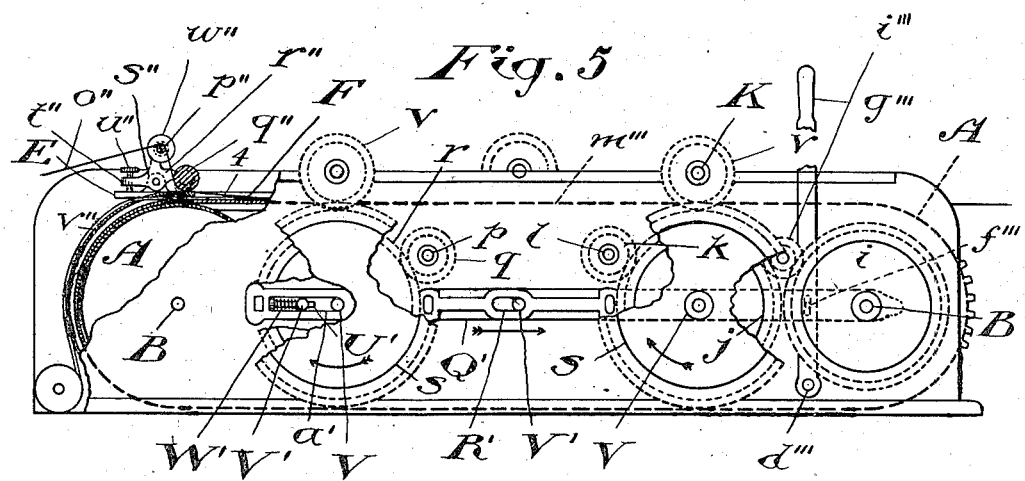
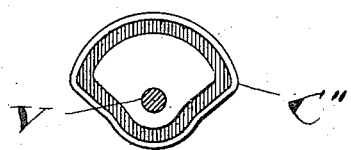
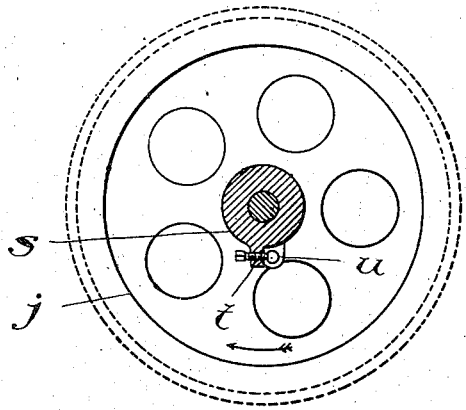
Witnesses
Fred Clarke
A. N. Neff
Inventor
Wm. G. Rochester
by
Ridout & Maybee
Attys (No Model.)　　　　　　　　　　　　　　8 Sheets—Sheet 6.
W. G. ROCHESTER.
APPARATUS FOR PRODUCING LITHOGRAPHS, &c.
No. 580,509.　　　　　　　　　　　Patented Apr. 13, 1897.

Witnesses　　　　　Inventor
Fred Clarke　　　　Wm G. Rochester
A W Neff　　　　　by Ridout & Maybee
　　　　　　　　　　　Attys (No Model.)　　　　　W. G. ROCHESTER.　　　8 Sheets—Sheet 7.
APPARATUS FOR PRODUCING LITHOGRAPHS, &c.

No. 580,509.　　　　　　　　　Patented Apr. 13, 1897.

Witnesses　　　　　　　　Inventor
Fred Clarke　　　　　　　Wm. G. Rochester
G. W. Neff.　　　　　　　by
　　　　　　　　　　　　Ridout & Maybee
　　　　　　　　　　　　　　Attys

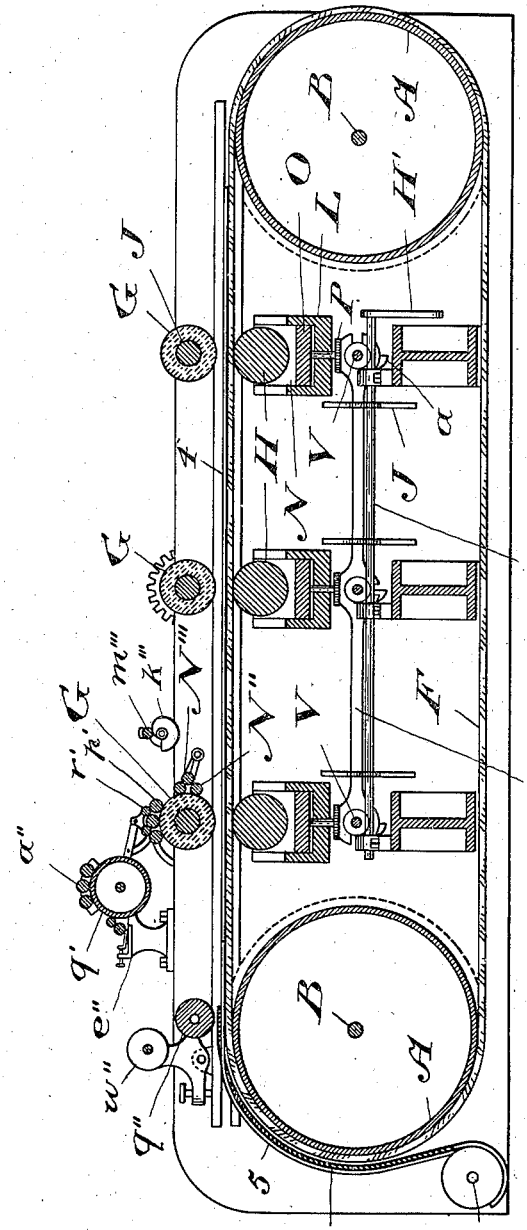

United States Patent Office.

WILLIAM GEORGE ROCHESTER, OF OTTAWA, CANADA, ASSIGNOR OF ONE-HALF TO GEORGE ARTHUR JOHNSTON, STUART HENDERSON, AND STUART E. DE LA RONDE, OF SAME PLACE, AND RICHARD ALEXIS HELMER, OF HULL, AND HARRY HOOPER WOOTTON, OF MONTREAL, CANADA.

APPARATUS FOR PRODUCING LITHOGRAPHS, &c.

SPECIFICATION forming part of Letters Patent No. 580,509, dated April 13, 1897.

Application filed April 18, 1896. Serial No. 588,114. (No model.)

*To all whom it may concern:*

Be it known that I, WILLIAM GEORGE ROCHESTER, engraver, of the city of Ottawa, in the county of Carleton and Province of Ontario, Canada, have invented a certain new and useful Apparatus for Producing Lithographs, Chromolithographs, Zincographs, and Steel and Copper Engravings, of which the following is a specification.

The object of my invention is to devise a process of and apparatus for producing rapidly and cheaply lithographs, chromolithographs, zincographs, steel and copper engravings, &c.; and it consists, essentially, in the use of one or more rollers, formed of lithographic stone, zinc, aluminium, copper, steel, or other material, to which the design to be printed is applied by a transfer process and which are provided with suitable pressure-rollers and damping or wiping and inking mechanisms, the whole being constructed in detail and the process carried out substantially as hereinafter more particularly described and then definitely claimed.

Before describing the particular machinery I employ I will briefly set out the process used in producing the various kinds of work hereinbefore set out as the object of my invention.

In the case of a stone roller a transfer is prepared on paper or other suitable substitute in the usual way and transferred to the roller by pressure. The roller is then put through the processes usual with a flat stone and impressions taken therefrom. It is now common to use zinc, aluminium, copper, or other metal plates as substitutes for stone, the process of transferring being substantially the same in principle, with such changes only as may be demanded by the peculiarities of the metal employed. Consequently any of these metals may be substituted for stone in the construction of the rollers used in my process. In the case of copper another process of transfer may be used, which is also applicable to a steel roller.

A relief of the design is prepared on a steel roller in the manner usual in bank-note transferring, which roller is afterward hardened. By revolving this roller in contact with a soft copper or steel roller under great pressure the relief design is transferred as a line-engraving to the latter, which after hardening may be printed from by inking and wiping, as is done from an engraved plate.

In the following specification I have described the mechanism as arranged for three-color chromolithography.

Figures 10, 13:
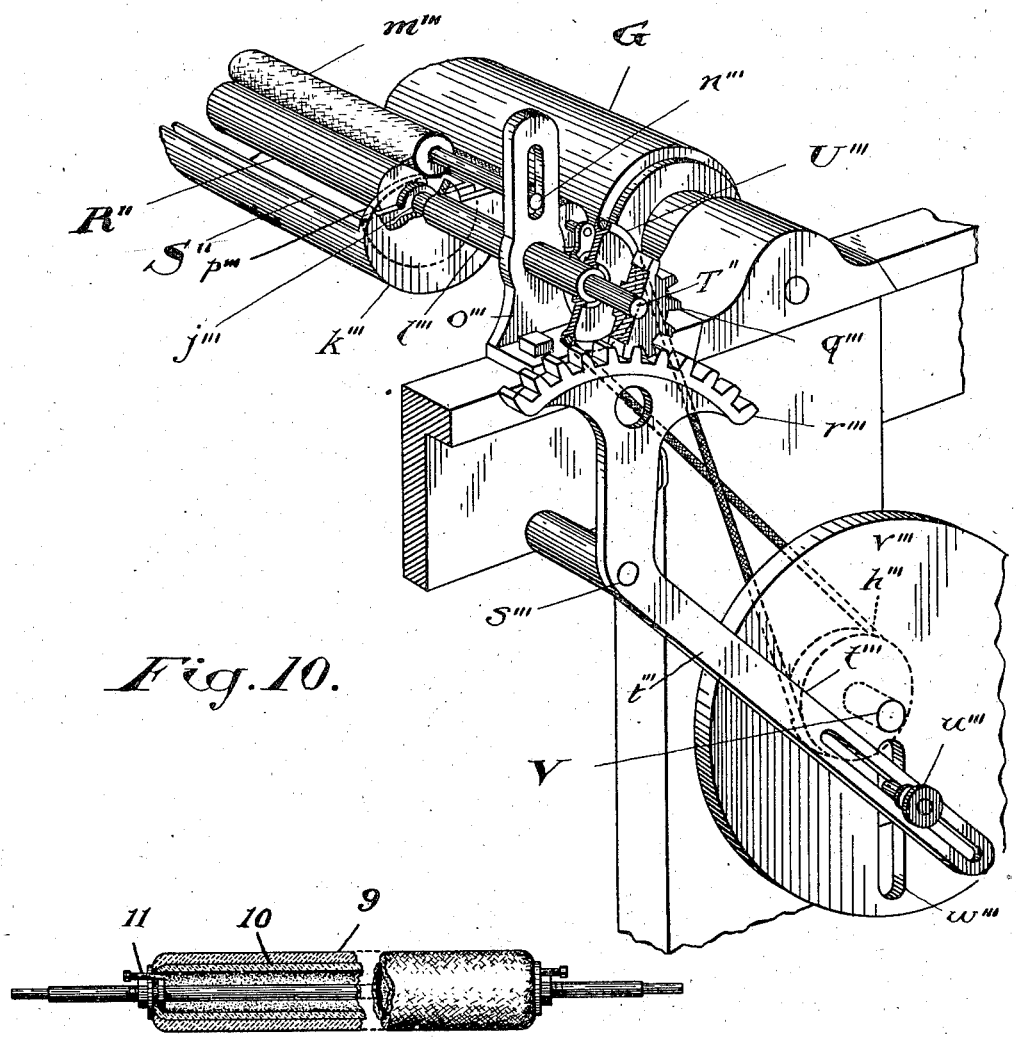
Figure 11:
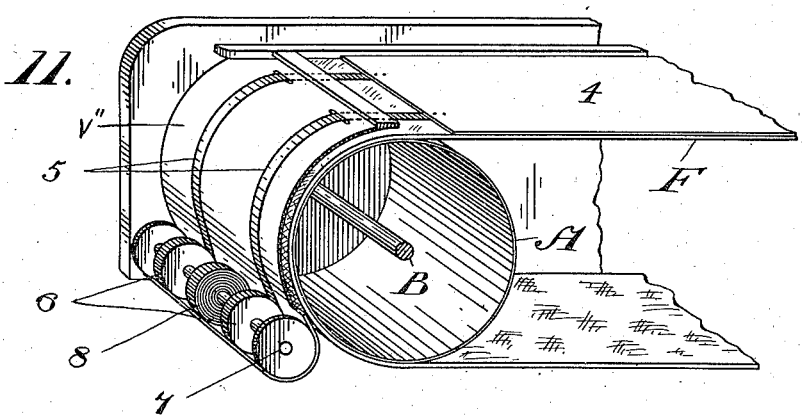
Figure 12:
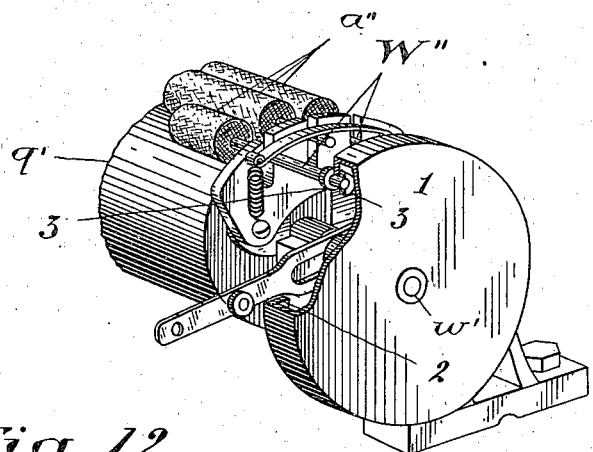

Figure 1 is a perspective view of my machine, the mechanism for one impression only being shown complete. Fig. 2 is a cross-section of the machine, showing one lithographic roller and one pressure-roller. Fig. 3 is a perspective detail showing the lithographic damping and inking rollers and the ink slab and fount, together with the mechanism for operating the damping and inking mechanisms. Fig. 4 is a perspective detail view showing the mechanism for operating the pressure-rollers. Fig. 5 is an elevation, with parts broken away, of the far side of the machine, showing the driving-gearing and the paper-feeding mechanism. Fig. 6 is a detail in elevation of the damping-roller-operating cam. Fig. 7 is an elevation of the lithographic-roller-driving gear-wheel and its connection with the driving gear-wheel on the same shaft. Fig. 8 is a detail in elevation showing the method of carrying the intermediate gear-wheel conveying motion to the ink-slab. Fig. 9 is a similar view showing the method of rotating the ink-fount roller. Fig. 10 is a perspective detail of the damping-fount and damping-table and mechanism for operating the same. Fig. 11 is a perspective detail of the tympan and the spring-roller for operating the same. Fig. 12 is a perspective detail of the cam for giving the ink-slab distributing-rollers an endwise motion. Fig. 13 is a sectional view of an inking or damping roller. Fig. 14 is a longitudinal central section of the machine.

In the drawings like letters and numerals of reference indicate corresponding parts in the different figures.

In Figs. 1 and 5, A A are drums fast on the shafts B, journaled at each end of the main frame C of the machine, as shown. These drums are provided with sprocket-wheels D, which are connected by sprocket-chains $m'''$, as shown, so that the drums revolve together. These sprocket-chains run in guides E, formed on each side of the main frame of the machine. (See Fig. 2.)

F is a continuous carrying-belt, of rubber or leather, carried by the drums A. As seen in Fig. 2, this belt passes between the lithographic rollers G and the pressure-rollers H. The lithographic rollers G are journaled at one end in a bearing I, sliding with a dovetail on the main frame of the machine. The other end of the spindle J of each lithographic roller is tapered, as indicated, to fit into a tapered recess in the spindle K, journaled on the main frame at the other side of the machine. $l'''$ is a projection on the hub of the hollow spindle K, which fits into a recess in the hub of the lithographic roller G, so as to securely lock it to the said spindle. From this construction it follows that by removing the bearing I the spindle J may be drawn out of the tapered recess in the spindle K and the lithographic roller entirely removed.

It will be seen that the spindles K of the end rollers G are at one side of the machine and the spindle K of the center roller at the other side.

The pressure-rollers H are each carried by a sliding frame L, each spindle M being journaled in bearing-blocks N, sliding, as shown in Figs. 2 and 4, at each end of the frame L. These bearing-blocks N rest on each end of a strong steel spring O, the center of which rests on an adjusting-screw P, threaded through the center of the sliding frame L.

Q are projections on each end of the sliding frame L, which fit in grooves R in the main frame of the machine. Each projection is recessed, as shown, to receive a spring S, which bears against a portion T of the projection Q and the bottom of the recess R, a guiding-rod U passing through the portion T of the projection and the coil-spring keeping the latter in position.

V are shafts, one of which is journaled in the main frame of the machine below each pressure-roller H.

W W are sleeves formed at each end of each shaft V. These sleeves have cam projections $a$, adapted when the sleeve is revolved to come in contact with the cam projections $b$ on the lower side of the sliding frame L, and thus raise the frame and the pressure-roller carried by it. A clutch connection is formed between these sleeves and the sleeves $c$, which slide on feathers on the shaft V in the manner usual in such clutch connections.

$d\ d$ are springs bearing against the sleeve $c$ and collars $e$, rigidly connected to the shaft V, so as to normally retain the clutches in connection.

As hereinafter described, means are provided to disengage the clutches at stated intervals, or when desired, but before describing this construction it will be necessary to clearly set forth the mechanism for rotating the lithographic rollers G and the shafts V.

$f$ is a gear-pinion rigidly connected to the spindle $g$, journaled on the main frame of the machine. To this spindle a driving-pulley or a hand-crank may be connected. (See Fig. 1.) This pinion meshes with a gear-wheel $h$, fast on the shaft B of the near drum A. On the other end of this shaft B is a gear-wheel $i$, meshing with a pinion $i'''$, meshing with a gear-wheel $j$ on the other end of the near pressure-roller shaft V. (See Figs. 2 and 5.) The gear-wheel $j$ meshes with the pinion $k$, fast on the spindle $l$. On the near end of this spindle $l$ is a pinion $m$, meshing with the gear-wheel $n$ on the near end of the second pressure-roller shaft V. (See Fig. 1.) This gear-wheel also engages with a pinion $o$, fast on the spindle $p$. On the other end of this spindle is a pinion $q$, meshing with the gear-wheel $r$ on the far end of the far pressure-roller shaft V. From these connections it follows that each pressure-roller shaft may be revolved in the direction indicated by arrow in Fig. 5.

On one end of each pressure-roller shaft V a gear-wheel $s$ is loosely journaled. On the end pressure-roller shafts V this gear-wheel is located on the far side of the machine (see Figs. 2 and 5) and at the near side of the center pressure-roller shaft, the gear-wheel $s$ on this last-mentioned shaft being removed in Fig. 1 to show the parts behind. Each gear-wheel $s$ has a projection on its hub, through which passes a set-screw $t$. (See Figs. 2 and 7.) The point of this screw bears against a pin $u$, carried by a projection on the hub of the gear-wheel $j$. From this construction it follows that the revolution of the gear-wheel on the shaft V will impart a rotary motion to the gear-wheel $s$, while the latter is free to move ahead of the gear-wheel $j$. This connection is of course formed between all the gear-wheels $s$ and the corresponding gear-wheels on the different pressure-roller shafts.
Each gear-wheel $s$ engages with a pinion $v$ on the spindle K, driving the lithographic roller G. $w$ is a disk fast to this spindle K and fitting into a recess on the pinion $v$. (See Figs. 1 and 2.)

$y$ is a clamping-bolt passing through a hole in the pinion $v$ and a slot $x$ in the disk $w$. From this construction it follows that the disk $w$, and with it the spindle K and the lithographic roller G, may be turned independently of the pinion $v$, so as to accurately set the roller so that its impression will register exactly with those made by the other lithographic rollers.

By the mechanism already described each revolution of the great gear-wheels of the machine produces four revolutions of the lithographic rollers, and during one of these revolutions the pressure-rollers H are brought up against the lithographic rollers by the action of the cams operated by the pressure-roller shafts V and the cams $b$ on the lower side of the sliding frames L, carrying the pressure-rollers. When these cams pass one another, the pressure-rollers drop, the shock of the drop being taken up by the coil-springs S.

On reference to Fig. 4 the mechanism for throwing the clutches on the shafts V out of connection will be seen.

$z$ is a pinion fast on the shaft B of the far drum A. This pinion meshes with a larger pinion A', journaled on the outside of the frame of the machine. On the face of this pinion is a cam B', adapted to engage with a friction-roller C' on the slide D', carried by the spindle of the pinion.

E' is a connecting-rod pivoted at one end to the slide D' and at the other to one arm of the bell-crank lever F'. The other arm of this bell-crank lever is pivotally connected by means of the rod G' to the crank-arm H', fast on the end of the rock-shaft I', journaled, as shown, on transverse portions of the main frame C.

J' are crank-arms set opposite to one another on the shaft I'. A set of these is provided for each of the pressure-roller shafts V, but only two of these connections are shown in Fig. 4. These crank-arms are pivoted to the connecting-rods K', secured at their other ends to bars L', having jaws M' formed at each end and in the center thereof. These jaws engage with grooves formed in the sleeves $c$. From this construction it follows that every time the cam B' comes in contact with the friction-roller on the slide D' the clutches on the shafts V are disconnected and that the pressure-rollers will not then be raised by the rotation of the shafts. By this means additional time is given for the inking and damping mechanism to operate on the lithographic rollers without an impression being taken, the precise time depending on the relative proportions of the gear-pinions $z$ and A'.

N' is a lever fulcrumed at its center and pivoted at one end to the slide D'. To the other end is pivoted a connecting-rod O', pivoted at the other end to a hand-lever P', pivoted at the other end of the machine. Thus by means of this hand-lever the slide D' may be moved and the clutches on the shaft V thrown out of connection for as long a period as the operator may desire, thus giving as much time as may be necessary to thoroughly ink and damp the rollers before starting to take impressions therefrom.

On reference to Figs. 1 and 3 the mechanism for damping and inking the lithographic rollers will be readily understood.

Q' are bars located one at each side of the machine and sliding on the ends of the shafts V and B, slots R' being provided therein to permit of their lengthwise motion on the shafts. Each end of the shaft B of the near drum A is provided with a cam S', engaging with a friction-roller T' on the end of the bar Q'. At the other end of each bar Q' a small rod U' is connected, as shown, lying in a long slot $a'$ in the bar and passing loosely through a hole in the pin V'. (See Fig. 5.)

W' is a coil-spring on the rod U', bearing against the pin V' and the end of the slot $a'$. From this construction it follows that the shaft may be moved in the direction indicated by arrow in Figs. 3 and 5 when the cam S' comes in contact with the friction-roller T' and that it will be returned to its original position by the spring W' when the low part of the cam comes opposite the friction-roller.

The inking and damping mechanism will be described in reference to one end of one of the lithographic rollers only, but it will of course be understood that the mechanism is repeated for each end of each lithographic roller used in the machine.

In Figs. 1 and 3, $b'$ is a lever pivoted on the spindle $l$. A pin $c'$ projects from the lower end of this lever into a slot $d'$, formed in the bar Q'. The upper part of the lever $b'$ is double, and the lever $e'$ is pivoted on the spindle $l$ between the two parts, but may be pivoted independently. The center of this lever is widened and slotted at $f'$, through which part a rod $g'$ passes. A pin $h'$ passes through the center of this rod and through slots $i'$ in the two parts of the lever $b'$.

$j'$ are coil-springs placed on each end of the rod $g'$ and bearing between the widened part $f'$ of the lever $e'$ and the nuts $k'$, by means of which the tension of the springs may be regulated.

The end of the lever $e'$ is pivoted on the spindle $l'$ of the head $n'$. This head has slots $m'$ formed therein to receive the ends of the spindles $o'$ of the leather-covered inking-rollers $p'$. These slots are made sufficiently deep so that the inking-rollers may accommodate themselves to the surface of either the lithographic roller G or the revolving ink-slab $q'$.

On one end of the spindle of each revolving ink-slab $q'$ is a gear-pinion $y''$, geared through an intermediate pinion $z''$ to the pinion $a'''$ on the spindle K of the corresponding lithographic roller G. (See Fig. 1.) The pinion $z''$ is connected to an arm $b'''$, carried by the spindle $w'$. This arm is held in position by the curved arm $c'''$, which is formed integral with the arm $b'''$ and is bolted, as shown, to the bracket on the main frame on which the ink-slab $q'$ is journaled. (See Fig. 8.) The arm $b'''$ is slotted, as shown, to permit of the gearing being changed to drive the ink-slab at any desired speed.

$r'$ are two steel pressure and distributing rollers each resting on two of the inking-rollers $p'$. (See Fig. 3.) The spindles $s'$ of these pressure and distributing rollers are journaled in a head $t'$, pivoted on a rod $u'$, journaled at each end on a sliding bar $v'$, which is slotted to slide on the spindle $w'$ of the revolving ink-slab $q'$ behind the collar $x'$.

A'' is a set-screw passing through the end of the sliding bar $v'$ and bearing against the spindle $w'$, so that the sliding bar may be held at any desired position on the spindle $w'$.

$B''$ is an arm pivoted at one end to the sliding bar $v'$ and at the other to the spindle $l'$.

From the construction already described it follows that when the bar $Q'$ is moved in the direction indicated by arrow the inking-rollers $p'$ are raised from the lithographic roller and pressed against the revolving ink-slab $q'$, the springs $j'$ insuring an elastic pressure of the inking-rollers against either the lithographic roller or the ink-slab.

While the inking-rollers are being raised, the arm $B''$, connected to the sliding bar $v'$, raises the pressure and distributing rollers $r'$ out of the path of the inking-rollers and returns them to their former position, when the inking-rollers are again lowered into contact with the lithographic rollers.

On each end of the near pressure-roller shaft V (see Figs. 2 and 3) is a cam $C''$. A pin $D''$ on one end of the bell-crank lever $E''$ engages with a cam-groove in this cam, which is best seen in Fig. 6. To the other end of this bell-crank lever a rod $F''$ is connected. The other end of this rod passes through a crank-arm $G''$, connected to the end of the spindle $H''$.

$I''$ are coil-springs bearing at one end against the crank-arm $G''$ and at the other against adjusting-nuts $J''$ on the rod $F''$.

$K''$ is a crank-arm loosely connected to the spindle $H''$ and pivoted at its other end to the center of the top of the T-head $L''$. At each end of the top of this T-head one of the spindles $M''$ of the cloth-covered damping-rollers $N''$ is journaled. The leg of the T-head $L''$ has a slot $O''$ formed therein, through which the spindle $M''$ of the third damping-roller $N'''$ passes.

$P''$ is another crank-arm rigidly connected to the spindle $H''$. This crank-arm has a slot $Q''$ formed therein, into which the spindle of the near damping-roller $N'''$ projects after passing through the slot $O''$ of the leg of the T-head $L''$. The effect of this construction is that when the spindle $H''$ is rocked the near damping-roller $N'''$ is drawn away from its companions before they have left the lithographing-roller, and by the time they have been withdrawn is in contact with the damping-fount roller $R''$, journaled on the main frame of the machine.

The far damping-rollers $N''$ are brought into contact with the lithographing-roller G first, and the near damping-roller $N'''$ is then brought into contact with the former. Thus the damping-rollers in contact with the lithographing-roller always receive their moisture at second hand from the near damping-roller $N'''$, which is never in contact with them and the damping-fount roller $R''$ at the same time.

The damping-fount roller $R''$ revolves in the damping-fount $S''$, which is always kept filled with water. (See Fig. 1.) To the end of the spindle $T''$ of the damping-fount roller a grooved pulley $U''$ is connected. This grooved pulley is connected by a cross-belt with a grooved pulley $h'''$ on the end of the pressure-roller shaft V. At the near end of Fig. 1 this pulley and belt are omitted, but they are clearly shown at the farther end of the view.

Instead of allowing the damping-roller $N'''$ to come directly in contact with the damping-fount roller $R''$, as shown in Figs. 1 and 3, I prefer to add the intermediate mechanism shown in Fig. 10. In this figure the damping-fount roller revolves in the damping-fount $S''$, which is hung from the spindle $T''$ of the damping-fount roller.

$k'''$ is a semicircular damping-table, each end of which is rigidly connected to the sleeve $l'''$, through which passes the spindle $T''$. This sleeve is journaled in a bearing $o'''$, connected to the main frame of the machine, as shown.

$m'''$ is the table damping-roller, the ends of the spindle $n'''$ of which slide in slots in the bearings $o'''$.

$p'''$ is a cam formed on the end of the damping-table $k'''$.

When the parts are in the position shown in the drawings, each end of the damping-table roller $m'''$ rests on one of the cams $p'''$, and the roller is at the same time in contact with the damping-fount roller $R''$. As the table is revolved the roller $m'''$ is lifted and passes over the surface of the table $k'''$, dropping back onto the damping-fount roller $R''$ when the damping-table has passed. It is against the surface of this table that the damping-roller $N'''$ will press, instead of against the damping-roller $R''$, as shown in Fig. 3. By interposing the damping-table roller $m'''$ and the damping-table $k'''$ between the damping-fount roller $R''$ and the damping-roller $N'''$ there is no possibility of too much moisture being imparted to the lithographic roller.

To the end of the spindle $T''$ is connected a pinion $q'''$, which meshes with a segmental rack $r'''$, pivoted at $s'''$ to the frame of the machine.

$t'''$ is an arm rigidly connected to the segmental rack $r'''$, and which is slotted to slide on a pin $u'''$, adjustable in a slot $w'''$ in the disk $v'''$. Thus by the revolution of the disk the segmental rack $r'''$ is reciprocated and the damping-fount roller $R''$ reciprocally rotated. By making the pin $u'''$ adjustable in the slot $w'''$ the throw of the rack is easily regulated. The disk $v'''$ is connected to one of the pressure-roller shafts V, to which is also connected, as previously described, a grooved pulley $h'''$, connected by a cross-belt with the grooved pulley $U''$, rigidly connected to the sleeve $l'''$. A rotary motion is thus imparted to the damping-table $k'''$.

In Fig. 1 the intermediate mechanism between the damping-fount roller $R''$ and the damping-rollers $N'''$ is omitted for simplicity, and the grooved pulleys $U''$ drive the damping-rollers instead of the damping-tables, the two being strictly analogous as being the parts from which the damping-rollers N'' and N''' derive their moisture.

The spindle of the ink-slab $q'$ is journaled, as shown, in a bracket extending upwardly from the main frame C of the machine. To this bracket a head U'''' is connected and has three slots V'' formed therein to receive the spindles W'' of the rubber-covered ink-slab distributing-rollers $a''$.

In Fig. 3, $b''$ is a curved metal bar lying on top of the spindles W'' and pivoted at $c''$ to the head U''''. A coil-spring $d''$ is connected to the other end of this curved metal bar and to the head U'''', so that it exerts a constant tension on the curved bar $b''$, and thus holds the ink-slab distributing-rollers firmly in contact with the surface of the ink-slab.

It is preferable to impart a slight endwise motion to the ink-slab distributing-rollers.

In Fig. 12, 1 is a cam rigidly connected to the spindle $w'$ of the ink-slab $q'$, and having a ring 2 on its inner face, which engages with the collars 3, formed on or connected to the ends of two of the spindles W'' of the ink-slab distributing-rollers $a''$. As shown, this ring is farther from the disk at certain parts of the circumference than at others, and it thus forms a cam to impart a slight reciprocating motion to the ink-slab distributing-rollers. In Figs. 1 and 3 these cams are omitted, to show the parts behind.

$e''$ is the ink-fount, of any suitable construction and securely connected to the bracket on which the spindle $w'$ is journaled. Each ink-fount contains ink of the color to be given the impression of its corresponding lithographing-roller.

$f''$ is the fount-roller, journaled near its front edge.

$g''$ is the rubber-covered feeding-roller, in contact with the ink on the fount-roller and the ink-slab. This roller is journaled in bearings adjustable in slides, as shown, so that the amount of ink it picks up may be easily regulated.

On one end of the spindle $h''$ of the fount-roller is a ratchet-wheel $i''$. On the same spindle is journaled an arm $j''$, carrying a spring-actuated dog $k''$, engaging with the teeth of the ratchet-wheel $i''$. (See Fig. 9.)

An arm $l''$ is pivoted at one end near the periphery of the revolving collar $x'$ on the spindle $w'$, and at the other end is connected with the arm $j''$ by means of a clamping-nut $m''$, a slot $n''$ being provided in the arm $j''$ to permit of the adjustment of the throw of the arm. The arm $l''$ may of course be connected to any other part which will give it a reciprocating motion. From this construction it will be seen that the ink-fount roller is intermittently rotated to supply fresh ink to the feeding-roller $g''$ and that the latter, which bears with more friction against the ink-slab than it does against the fount-roller, is continuously rotated by said ink-slab and applies ink thereto.

In Figs. 1 and 5 will be seen the paper-feeding and tension mechanism. To the end of the machine, when complete, will be connected brackets to hold a roll of paper, but owing to lack of room these have been omitted from the drawings. The paper $o''$ will pass from this roll over the guiding-roller $p''$ and thence under the tension-roller $q''$, thence onto the surface of the carrying-belt F, by which it is carried between the lithographic and pressure rollers. The guiding-roller $p''$ and tension-roller $q''$ are journaled in heads $r''$, pivoted on lugs $s''$ at each side of the machine. Each head $r''$ has a lug $t''$ projecting therefrom, through which passes a set-screw $u''$, bearing against the upper side of the guide E or other convenient part. The tension-roller $q''$ rests on the upper surface of a curved guard $v''$, extending from side to side of the machine and connected thereto in any suitable manner. It will be seen that by tightening or loosening the set-screw $u''$ the tension-roller $q''$ may be made to press the paper against the upper surface of the curved guard $v''$, so as to give the said paper any tension desired.

$w''$ are guiding-collars adjustably connected to the roller $p''$, so that they may be shifted to properly guide whatever width of paper may be passing through the machine.

In Fig. 11 will be seen the tympan 4, which lies on top of the carrying-belt F. This tympan is also seen in Fig. 2 and is for the purpose of giving a hard surface beneath the paper when an impression is being made. The tympan might be made of a continuous belt of sheet-steel or papier-mâché surrounding the carrying-belt F, or it may be made, as shown in Fig. 11, merely of sufficient length to reach from one end of the machine to the other. In this case it is of course made to travel forward, when it is gripped between the belt F and the lithographic rollers while an impression is being made. To return it to its original position for a new impression, I connect to one end of it two flexible metal strips 5, which are wound on disks 6 on the roller 7, operated by the spring 8. This roller is connected to the end of the frame of the machine, and consequently tends to keep the tympan in the position shown. It should be mentioned that the metal strips 6 pass through slots in the curved guard $v''$.

Having set out the construction of my machine, I will now briefly describe its operation.

In all lithographic processes the first step is to polish the stones and to transfer the drawings from the lithographic transfer-paper to the lithographic stones or rollers, the drawing for each stone consisting, as usual, of those parts of the complete impression which are to appear of the color that that particular stone is arranged to print. To do this it is necessary to first remove the inking and damping rollers. Then the transfers are run through the machine. The transfer-paper adheres to the stones and is wound upon them, so that the press may be run until the pressure-rollers have risen several times and thus thoroughly rolled the transfer-paper into contact with the stones. The transfer-paper is now dampened and removed and the stones washed off. The inking and damping rollers are now replaced and the lithographic rollers thoroughly inked up. After inking or rolling up they may be etched in the machine by washing with the diluted acid usually used, or they may be removed and etched in suitable tanks. After etching they are gummed in the usual way and are then ready for printing. The operator now grasps the hand-lever P' (see Fig. 4) and by operating it throws the clutches on the shafts V out of connection, so that the pressure-rollers remain in their lowered position. This enables the inking and damping rollers to thoroughly damp and ink the lithographic rollers before any impression is taken. The hand-lever P' is then released and the tension-roller $q''$ is loosened and the carrying-belt F is allowed to draw the paper through the machine. When the paper arrives under the first lithographic roller, the pressure-rollers rise and an impression is taken. When this impression has been carried under the second lithographic roller, the pressure-rollers rise as before and a second impression is made on top of the first, and at the same time a fresh impression is made by the first lithographic roller. The paper continues to travel forward, and when the double impression arrives under the third lithographic roller the pressure-rollers again rise and the third impression is added on top of the two already superimposed, and in a machine constructed, like the present, for three colors the impression is complete. While this impression is being completed, the other two rollers have been respectively operating, as already described. As soon as the paper arrives under the third roller the tension-roller $q''$ is tightened, so as to give the necessary tension to insure the paper being evenly drawn through the machine.

Although the belt F travels continuously, yet the paper is only fed while it, the tympan, and the belt are engaged between the pressure-rollers and lithographing-rollers. If no tympan were used and the lithographic rollers were sufficiently far apart, the paper might travel continuously and the pressure of the tension-rollers Q'' would be required to be very light.

Such in brief is the operation of my machine, but it will be necessary to enter more into the details of the operation of each lithographic roller, what is said of one being of course applicable to all.

The gearing in the machine is so proportioned that one revolution of the great gear-wheels corresponds to a single impression. One revolution of the great gear-wheels is equal to four revolutions of the lithographic roller and four revolutions of the rotary ink-slab. Of these four revolutions of the lithographic roller one revolution is made while the damping-rollers are in contact with it, the next two revolutions while the inking-rollers are in contact with it, and one revolution while the damping and pressure rollers are in contact with it and while an impression is being made on the paper passing through the machine.

If the pinion $z$ is in mesh with the pinion A', as previously described, there will be eight revolutions of each lithographic roller to an impression. Of these eight revolutions the first one is made when the damping-rollers are in contact with the lithographic roller, the next two while the inking-rollers are in contact with it, the next two while the damping-rollers are in contact with it, and the next two while the inking-rollers are in contact with it, and one revolution made while the damping-rollers and pressure-rollers are in contact with it is for making the impression on the paper passing through the machine; but ordinarily these pinions would be disconnected, as extra inking and damping are only needful in certain cases where extra thickness of ink is required for the impression.

If it is found after making the first impression that the impression of one of the lithographic rollers does not register properly with the previous impression or impressions, the roller may be turned slightly by loosening the clamping-bolt $y$, which permits the roller to be revolved within the limit of the slot $x$, as previously described. Thus means are provided whereby the impressions of all the lithographic rollers may be accurately registered.

It may happen that as a lithographic roller becomes worn by use one of its revolutions may not correspond exactly with one quarter-revolution of the great gear-wheels of the machine. If this is so, the gear-wheel $s$ would not revolve the lithographic roller fast enough to suit the speed at which the carrying-belt will revolve the said roller, and it is necessary to make provision to allow the lithographic roller to revolve a little faster than will be permitted by a rigid gear connection. It is with this view that a loose connection is formed between the gear-wheels $s$ and $j$, as already described. (See Figs. 2 and 7.)

The carrying-belt F, being gripped between the lithographic roller and the pressure-roller, imparts motion to both while the impression is being made, and as these rollers are in contact for a sufficient length of time to fully complete an impression the lithographic roller will be rotated by the carrying-belt F sufficiently to complete its impression independent of its gear connection with the pressure-roller shaft.

It is sometimes necessary to hold the ink-rollers off the lithographic roller in case of the surface of the lithographic roller being accidentally soiled by dirt or grease. To effect this, a shaft $d'''$ is journaled across the frame of the machine. A crank-arm $e'''$ is connected to each end of this shaft. (See Figs. 3 and 5.) Each crank-arm is slotted at its upper end to engage with a pin $f'''$ on each sliding bar Q. $g'''$ is a hand-lever (see Figs. 1 and 5) connected to one end of this shaft, so that by rocking the hand-lever the sliding bars Q' may be moved so as to raise the inking-roller from the surface of the lithographic roller while the dirt or the grease is being removed.

In Fig. 13 is shown a preferable form of roller for either inking or damping. It is found in practice that the ordinary blanket and leather-covered roller is not entirely satisfactory, and after working for a time the leather stretches and has to be pulled and cut off at the ends in order to keep its surface in condition to produce uniform distribution. To remedy this defect, the roller is preferably constructed with an outer leather covering 9, and an inner inflated rubber tube 10, the open ends of which are suitably held between jam-nuts, as shown, in order to form an air-tight joint.

11 are two air-inlet pipes by means of which the tube 10 may be inflated. These are provided with screw-caps or may be fitted with valves, such as used in inflating bicycle-tires. As the leather stretches the tube may be further inflated to keep the surface of the leather properly taut, so that uniform distribution may be effected.

It will of course be understood that the proportion of the gearing and other parts may be widely varied without departing from the spirit of my invention.

In the machine as shown in the drawings the rotary motion of the lithographic and other rollers is in one direction, but it is obvious that the same object would be accomplished by giving them a reciprocating rotary motion.

I describe the machine as arranged to print three colors, but any number of lithographic rollers may be used, so as to print in as many colors as may be desired.

It will be understood that wherever the words "lithographic roller" or "lithographing-roller" are used in the specification and claims they are to be taken to cover the other forms of rollers previously specified.

It is not necessary to use the same kind of roller in each section of the machine. Each style of roller has its own peculiarities, and in some classes of work rollers of a different kind may be used on the same job.

By changing the gearing the machine could be so arranged that the impression from the rollers instead of being superimposed would fall side by side, in which case several different jobs could be turned out at the same time.

When the impression on the roller is in the nature of a line engraving on metal, it will be necessary to remove the damping-fount and use the damping-roller mechanism to wipe the impression-roller after inking and before printing, the reason for which will be well understood by copper and steel plate workers.

What I claim as my invention is—

1. In a press, a series of cylindrical lithographic stones or rollers, in combination with a corresponding number of pressure-rollers; means for damping and inking each lithographic roller; means for automatically bringing the pressure-rollers up against the lithographic rollers at regular intervals; an endless belt passing between the lithographic and pressure rollers and carried by suitable drums; and means for rotating the said drums and the lithographic rollers, substantially as and for the purpose specified.

2. In a press, a cylindrical lithographic stone or roller, in combination with a pressure-roller supported on a spring carried by a frame sliding in grooves on the main frame of the machine; a pressure-roller shaft; cams on the said shaft adapted to raise the sliding frame and means for rotating the said shaft and lithographic roller, substantially as and for the purpose specified.

3. In a press, one or more pressure-rollers each supported on a spring carried by a frame sliding in guideways on the main frame of the machine, in combination with one or more pressure-roller shafts journaled in the main frame; means for revolving said shaft; sleeves loose on each shaft each forming one-half of a clutch and having cams thereon adapted to raise the sliding frame when the sleeves are rotated; sleeves sliding on feathers on the shaft and each forming the corresponding half of a clutch; springs adapted to hold the sleeves in clutch; a pair of bars having jaws engaging with grooves in the sliding sleeves; a rock-shaft journaled on the main frame; crank-arms rigidly connected to the rock-shaft; rods connecting the aforesaid bars and the ends of the crank-arms, and means for operating the said rock-shaft, substantially as and for the purpose specified.

4. In a press, one or more pressure-rollers each supported on a spring carried by a frame sliding in guideways on the main frame of the machine, in combination with one or more pressure-roller shafts journaled in the main frame; means for revolving said shafts; sleeves loose on each shaft, each forming one-half of a clutch and having cams thereon adapted to raise the sliding frame when the sleeves are rotated; sleeves sliding on feathers on the shaft and each forming the corresponding half of a clutch; springs adapted to hold the sleeves in clutch; a pair of bars having jaws engaging with grooves in the sliding sleeves; a rock-shaft journaled on the main frame; crank-arms rigidly connected to the rock-shaft; rods connecting the aforesaid bars and the ends of the crank-arms; a crank-arm rigidly connected to the said rock-shaft; a bell-crank lever fulcrumed on the main frame; a connecting-rod pivoted to the bell-crank lever and the said crank-arm; a slide suitably supported; a connecting-rod pivoted to the bell-crank lever and the slide; a cam adapted to operate the slide and means for operating the cam substantially as and for the purpose specified.

5. In a press, the combination of the following elements: the shaft B; the pinion $z$; the pinion A'; the cam B' the slide D'; the friction-roller C'; the connecting-rod E'; the bell-crank lever F'; the connecting-rod G'; the crank-arm H'; the rock-shaft I'; the crank-arms J'; the connecting-rods K'; the bars L'; jaws M', engaging with grooves on the sleeves $c$, sliding on feathers on the shafts V; means for revolving the shafts V; sleeves W, having a clutch connection with the sleeves $c$; springs $d$, and collars $e$, and cams $a$, adapted to raise the sliding frames L, when the sleeves W, are revolved, substantially as and for the purpose specified.

6. In a press, the combination of the following elements: the shaft B; the pinion $z$; the pinion A'; the cam B'; the slide D'; the friction-roller C'; the lever N'; the connecting-rod O'; the hand-lever P'; the connecting-rod E'; the bell-crank lever F'; the connecting-rod G'; the crank-arm H'; the rock-shaft I'; the crank-arms J'; the connecting-rods K'; the bars L'; jaws M' engaging with grooves on the sleeves $c$, sliding on feathers on the shafts V; means for revolving the shafts V; sleeves W, having a clutch connection with the sleeves $c$; springs $d$ and collars $e$, and cams $a$, adapted to raise the sliding frame L when the sleeves W are revolved, substantially as and for the purpose specified.

7. In a press, the pressure-roller H; bearing-blocks N; spring O; sliding frame L; adjusting-screw P; projections Q; grooves R; and cam projections $b$, in combination with the shaft V; sleeves W; cam projections $a$; movable clutch connections between the shaft V and the sleeves W, and means for revolving the shafts V, substantially as and for the purpose specified.

8. In a press, the pressure-roller H; bearing-blocks N; spring O; sliding frame L; adjusting-screw P; recessed projections Q; grooves R; springs S; guiding-rods U; bearing portions T, of the projections Q, and cam projections $b$, in combination with the shaft V; sleeves W; cam projections $a$; movable clutch connections between the shaft V and the sleeves W and means for revolving the shafts V, substantially as and for the purpose specified.

9. In a press, the combination of a series of lithographic rollers; a series of pressure-rollers and a series of pressure-roller shafts geared together and adapted to raise the pressure-rollers at regular intervals against the lithographic rollers, each of which is geared to the pressure-roller shaft of its corresponding pressure-roller; two drums located at each end of the machine; a gear-wheel fast on the shaft of one of the drums; gearing connecting the said gear-wheel with the gear-train of the pressure-roller shafts; means for conveying motion from the above-mentioned drum to the drum at the other end of the machine and a carrying-belt passing round the said drums and between the pressure and lithographing rollers, substantially as and for the purpose specified.

10. In a press, the combination of pressure and lithographing rollers suitably journaled, a pressure-roller shaft and a pinion connected to the spindle of the said lithographing-roller, a gear-wheel loose on the said pressure-roller shaft; a projection formed on the hub of the said gear-wheel and a projection connected with the said shaft and engaging with the projection on the loose gear-wheel so that the latter will be revolved by the rotation of the pressure-roller shaft, but is free to move forward independently of the latter substantially as and for the purpose specified.

11. In a press, the combination of pressure and lithographing rollers, a pinion $v$ connected to the spindle of the lithographing-roller, a gear-wheel $s$ loose on the shaft V; a set-screw $l$ screwed through a projection on the hub of gear-wheel $s$; a gear-wheel $j$, on the shaft V and the pin $u$ carried by a projection on the hub of the gear-wheel $j$ or on the shaft V, substantially as and for the purpose specified.

12. In a press, two levers $b'$ pivoted at their centers on the main frame at opposite sides thereof; two levers $e'$ also pivoted on the main frame and each having a spring connection with one end of one of the levers $b'$; two heads $n'$ having spindles $l'$ on which the ends of the levers $e'$ are pivoted; two or more inking-rollers $p'$ having spindles $o'$ lying in slots $m'$ in the heads $n'$ in combination with a lithographing-roller, a cylindrical ink-slab and two sliding bars Q' slotted to engage with pins $c'$ on the ends of the levers $b'$, substantially as and for the purpose specified.

13. In a press, the lithographing-roller G, and the cylindrical ink-slab $q'$; in combination with the spindles $l'$; heads $n'$ slotted at $m'$; inking-rollers $p'$; spindles $o'$; pressure and distributing rollers $r'$; spindles $s'$; heads $t'$ journaled on the sliding bars $v'$, slotted to slide on the spindle $w'$ of the ink-slab $q'$; the arm B''; and means for moving the heads $n'$ so as to reciprocate the inking-rollers between the lithographic roller and the ink-slab, substantially as and for the purpose specified.

14. In a press, the lithographing-roller G, and the cylindrical ink-slab $q'$; in combination with the spindles $l'$; heads $n'$ slotted at $m'$; inking-rollers $p'$; spindles $o'$; pressure and distributing rollers $r'$; spindles $s'$; heads $t'$; rod $u'$ journaled on the sliding bars $v'$, slotted to slide on the spindle $w'$ of the ink-slab $q'$; the collars $x'$; the arms B'' and means for moving the heads $n'$ so as to reciprocate the inking-rollers between the lithographic roller and the ink-slab, substantially as and for the purpose specified.

15. In a press, the lithographing-roller G, and the cylindrical ink-slab $q'$; in combination with the spindles $l'$; heads $n'$ slotted at $m'$; inking-rollers $p'$; spindles $o'$; pressure and distributing rollers $r'$; spindles $s'$; heads $t'$; rod $u'$ journaled on the sliding bars $v'$, slotted to slide on the spindle $w'$ of the ink-slab $q'$; the collars $x'$; set-screws $A''$; the arms $B''$, and means for moving the heads $n'$ so as to reciprocate the inking-rollers between the lithographic roller and the ink-slab, substantially as and for the purpose specified.

16. In a press, the lithographing-roller G and the ink-slab $q'$, in combination with the heads $n'$ carrying the inking-rollers $p'$; the spindles $l'$; the levers $e'$ pivoted on the spindle $l$ or its equivalent and widened and slotted at $f'$; the levers $b'$ pivoted at the same points as the levers $e'$ and made double at their upper portions to embrace the levers $e'$; the rods $g'$; pins $h'$ passing through the rods $g'$ and through slots $i'$ in the levers $b'$; the coil-springs $j'$; the nuts $k'$; the pins $c'$ on the lower ends of the levers $b'$, and the sliding bars $Q'$, slotted at $d'$ to receive the pins $c'$, substantially as and for the purpose specified.

17. In a press provided with inking-rollers and an ink-slab, bars arranged to slide one on each side of the machine, each sliding bar being provided with a pin or friction-roller; a cam on each end of one of the revolving shafts of the machine adapted to engage with the pins or friction-rollers so as to slide the bars and springs adapted to return the sliding bars to their normal position when released by the cams, in combination with a series of levers pivoted on each side of the machine, one arm of each lever being provided with a pin which engages with a slot in one of the sliding bars, and the other end connected with said inking-rollers so as to reciprocate them when the bars are operated, substantially as and for the purpose specified.

18. In a press provided with inking-rollers and an ink-slab, bars arranged to slide one on each side of the machine, a shaft journaled in the frame of the machine, a hand-lever for rocking said shaft, a slotted crank-arm connected to said shaft, and a pin provided on each of said sliding bars and arranged to engage with said slotted crank-arm, in combination with a series of levers pivoted on each side of the machine, one arm of each lever being provided with a pin which engages with a slot in one of said sliding bars, and the other end connected with the said inking-rollers so as to reciprocate them when the bars are operated, substantially as described.

19. In a press provided with inking-rollers and an ink-slab, the combination of the bars $Q'$ arranged to slide one on each side of the machine; the pins or friction-rollers $T'$; the cams $S'$ on the shaft $B$; the springs $W'$; rod $U'$ and pins $V'$, located in slots in the bars $Q'$; the shaft $d'''$; crank-arms $e'''$; pins $f'''$ entering slots in the crank-arms $e'''$; levers $b'$; pins $c'$ entering slots $d'$ in the bars $Q'$; the levers $b'$ being connected with said inking-rollers so as to reciprocate them when the bars are operated, substantially as and for the purpose specified.

20. In a press, a cylindrical ink-slab having its spindle journaled in a bracket on the main frame, in combination with an ink-fount attached to the same bracket; a fount-roller journaled at the front edge of the fount, a feeding-roller similarly journaled and interposed between and in contact with both the fount-roller and the ink-slab, and means for rotating the ink-slab and intermittently rotating the fount-roller, substantially as and for the purpose specified.

21. In a press, the lithographing-roller G, having a pinion $a''''$ connected to its spindle, in combination with the ink-slab $q'$ suitably journaled; pinion $y''$ rigidly connected to the spindle $w'$; pinion $z''$ rigidly connected to the arm $b''''$ loose on the shaft $w'$; and the arm $c''''$ integral with the arm $b''''$ and securely bolted to the main frame or a bracket extending therefrom, substantially as and for the purpose specified.

22. In a press, two levers, each pivoted at one end to the frame of the machine and at the other to one of two heads in which are journaled one or more inking-rollers; a cylindrical ink-slab; a lithographing-roller; a damping roller or table moistened by suitable means from a damping-fount; damping-rollers carried by crank-arms extending from a spindle journaled in the main frame; a crank-arm connected to the said spindle; a rod connecting the crank-arm to a bell-crank lever pivoted on the same pivot as the levers operating the inking-rollers, and means for rocking the said levers, substantially as and for the purpose specified.

23. In a press, a lithographing-roller and a damping roller or table moistened by suitable means from a damping-fount, in combination with one or more damping-rollers journaled in heads pivoted on crank-arms loosely connected to a spindle journaled in the main frame; a damping-roller having each end of its spindle extending through a slot in one of the said heads into a slot in one of a second pair of crank-arms also connected to the said spindle and means for rocking the said spindle, substantially as and for the purpose specified.

24. In a press, the combination of a damping table or roller, means for moistening the same; the spindle $H''$; crank-arms $K''$; T-heads $L''$, pivoted on the crank-arms $K''$; two damping-rollers $N''$ journaled in the T-heads $L''$; crank-arms $P''$; damping-roller $N'''$, having the ends of its spindle passing through slots $O''$ in the legs of the T-heads $L''$ into slots $Q''$ in the crank-arms $P''$, and means for rocking the said spindle $H''$, substantially as and for the purpose specified.

25. In a press, the combination of a damping table or roller; means for moistening the same; the spindle $H''$; crank-arms $K''$; T-heads $L''$; pivoted on the crank-arms $K''$; two damping-rollers $N''$ journaled in the T- heads L''; crank-arms P''; damping-roller N''''; having the ends of its spindle passing through slots O'' in the legs of the T-heads L'' into slots Q'' in the crank-arms P''; crank-arms G''; rods F''; springs I''; adjusting-nuts J''; bell-crank levers E''; pins D''; cam C'' on a second shaft V, and means for rotating the shafts, V, substantially as and for the purpose specified.

26. In a press, the ink-slab feeding and distributing mechanism comprising the following elements: the ink-slab $q'$ having its spindle $w'$ journaled in brackets connected to the main frame of the machine; the heads U''''  connected to the same brackets; the ink-slab distributing-rollers $a'''$; spindles W'' lying in slots V'' in the heads U''''; curved metal bars $b''$; springs $d''$; ink-fount $e''$; ink-fount roller $f''$, feeding-roller $g''$ and means for revolving the ink-slab and the ink-fount roller, substantially as and for the purpose specified.

27. In a press, a paper feeding and tension device comprising a guiding-roller $p''$ and tension-roller $q''$ journaled in the heads $r''$ pivoted on lugs $s''$ at each side of the machine; lugs $t''$, set-screws $u''$ bearing against the upper side of the guides E or other convenient part and the guard $v''$ extending from side to side of the machine, substantially as and for the purpose specified.

28. In a press, a paper feeding and tension device comprising a guiding-roller $p''$; adjustable guiding-collars $w''$; tension-roller $q''$, journaled in the heads $r''$, pivoted on lugs $s''$ at each side of the machine; lugs $t''$; set-screws $u''$ bearing against the upper side of the guides E, or other convenient part and the guard $v''$ extending from side to side of the machine, substantially as and for the purpose specified.

29. In a press, the lithographing-roller G, having a spindle J, one end of which is tapered, in combination with the hollow spindle K, tapered to receive the tapered end of the spindle J, and the bearing I sliding in a dovetail on the main frame of the machine, the other end of the spindle J being journaled in the said bearing I, substantially as and for the purpose specified.

30. In a press, the lithographing-roller G; spindle J; bearing-block I, sliding in a dovetail in the main frame of the machine, hollow spindle K tapered to receive the tapered end of the spindle J; projection $l'''$ on the hub of the hollow spindle K, fitting into a recess in the hub of the lithographing-roller G, substantially as and for the purpose specified.

31. In a press, a damping-fount and a damping-fount roller adapted to revolve therein, in combination with a semicylindrical damping-table adapted to revolve about the damping-fount, a damping-table roller normally in contact with the damping-fount roller and so carried as to be vertically movable; and a cam or cams formed on or connected to the damping-table so arranged that they will raise the damping-table roller into a position to come into contact with the revolving damping-table, substantially as and for the purpose specified.

32. In a press, the damping-fount roller R'' having a spindle T'' and the damping-fount S'' swung from the said spindle in combination with the damping-table $k'''$ rigidly connected to the sleeve $l'''$ through which the spindle T'' passes; slotted bearings $o'''$, roller $m''''$ having a spindle $n''''$ adapted to slide in the slots in the bearings $o'''$, cams $p'''$; and means for rotating the sleeve $l'''$, and the spindle T'', substantially as and for the purpose specified.

33. In a press, the damping-fount roller R'', having a spindle T'', and the damping-fount S'' swung from the said spindle, in combination with the damping-table $k'''$, rigidly connected to the sleeve $l'''$, through which the spindle T'' passes; slotted bearings $o'''$; roller $m''''$, having a spindle $n''''$, adapted to slide in the slots in the bearings $o'''$; cams $p'''$; shaft V; pulley $h'''$, on the shaft V; pulley U'', on the sleeve $l'''$; pinion $q'''$ on the spindle T''; slotted arm $t''''$, sliding on the pin $u''''$, adjustable on the disk $v''''$, on the shaft V, substantially as and for the purpose specified.

34. In a press, the ink-slab feeding and distributing mechanism comprising the following elements: the ink-slab $q'$ having its spindle $w'$ journaled in brackets connected to the main frame of the machine; the heads U'''' connected to the same brackets; the ink-slab distributing-rollers $a''$; spindles W'', lying in slots V'', in the heads U'''', curved metal bars $b''$; springs $d''$; cam 1 on the ink-slab spindle W', having a cam-ring 2, engaging with collars 3, on one or more of the spindles W''; ink-fount $e''$; ink-fount roller $f''$; feeding-roller $g''$ and means for revolving the ink-slab and the ink-fount roller, substantially as and for the purpose specified.

35. In a press, the combination of the carrying-belt F; drums A; one or more lithographic rollers G; one or more pressure-rollers H; the tympan 4; flexible strips 5; a spring-roller adapted to wind up the said strips, means for revolving the lithographic roller and belt, and means for raising and lowering the pressure-roller, substantially as and for the purpose specified.

Ottawa, August 22, 1895.

WILLIAM GEORGE ROCHESTER.

In presence of—
CHAS. MURPHY,
J. B. RATHBONE.